(12) United States Patent
Dorst (10) Patent No.: US 12,270,608 B2
(45) Date of Patent: Apr. 8, 2025

(54) TRANSPORTATION TRAY FOR TRANSPORTING AND HEATING CHEMICAL SUBSTANCES

(71) Applicant: SAINT-GOBAIN INDUSTRIEKERAMIK RÖDENTAL GMBH, Rödental (DE)

(72) Inventor: Hans-Ulrich Dorst, Rödental (DE)

(73) Assignee: SAINT-GOBAIN INDUSTRIEKERAMIK RÖDENTAL GMBH, Rödental (DE)

( * ) Notice: Subject to any disclaimer, the term of this patent is extended or adjusted under 35 U.S.C. 154(b) by 385 days.

(21) Appl. No.: 17/795,726

(22) PCT Filed: Jan. 27, 2021

(86) PCT No.: PCT/EP2021/051810
§ 371 (c)(1),
(2) Date: Jul. 27, 2022

(87) PCT Pub. No.: WO2021/151917
PCT Pub. Date: Aug. 5, 2021

(65) Prior Publication Data
US 2023/0070101 A1    Mar. 9, 2023

(30) Foreign Application Priority Data
Jan. 28, 2020 (DE) .................... 10 2020 000 510.1

(51) Int. Cl.
*F27D 5/00* (2006.01)
*H01M 4/04* (2006.01)
*H01M 4/02* (2006.01)

(52) U.S. Cl.
CPC ......... *F27D 5/0068* (2013.01); *F27D 5/0006* (2013.01); *H01M 4/0471* (2013.01); *H01M 2004/028* (2013.01)

(58) Field of Classification Search
CPC .... F27D 5/0068; F27D 5/0006; F27D 5/0012; B65D 85/84; B65D 25/14; B65D 88/12; B65D 90/04; B65D 90/046
See application file for complete search history.

(56) References Cited

U.S. PATENT DOCUMENTS 2,297,286 A   9/1942  Book
3,988,107 A * 10/1976 Koch .................... F27D 5/0012
                                                    432/253

(Continued)

FOREIGN PATENT DOCUMENTS

CN           107883774 A  *  4/2018
DE    10 2005 024957 A1    12/2006

(Continued)

OTHER PUBLICATIONS

International Search Report as issued in International Patent Application No. PCT/EP2021/051810, dated May 21, 2021.

*Primary Examiner* — Gregory A Wilson
(74) *Attorney, Agent, or Firm* — Pillsbury Winthrop Shaw Pittman LLP (57) ABSTRACT

A transport tray for transporting and heating chemical substances, includes a one-piece support structure with a base and a frame fixedly connected thereto, wherein the support structure supports a lining of a tray-shaped cavity for accommodating the chemical substances, wherein the lining includes a base plate lying on the base and multiple frame plates clamped against the frame, wherein the lining is supported by the support structure such that the thermal expansions of the base plate and the frame plates in their plate planes are not impeded.

22 Claims, 9 Drawing Sheets

(56) References Cited

U.S. PATENT DOCUMENTS

| | | | | |
|---|---|---|---|---|
| 4,330,269 A | * | 5/1982 | Chu | F27D 5/0012 |
| | | | | 432/259 |
| 9,534,847 B2 | * | 1/2017 | Do | F27D 5/0068 |
| 10,054,365 B2 | * | 8/2018 | Sonntag | F27D 3/0021 |
| 10,107,550 B2 | * | 10/2018 | Waniuk | F27B 14/061 |
| 11,713,925 B2 | * | 8/2023 | Park | C04B 35/481 |
| | | | | 266/171 |
| 2019/0218150 A1 | | 7/2019 | Ihara et al. | |
| 2021/0269365 A1 | * | 9/2021 | Dorst | C04B 35/565 |

FOREIGN PATENT DOCUMENTS

| | | | | |
|---|---|---|---|---|
| DE | 10 2011 052016 A1 | | 1/2013 | |
| DE | 202021004154 U1 | * | 12/2022 | |
| EP | 0 452 718 B1 | | 6/1994 | |
| JP | 2017178681 A | * | 10/2017 | |
| KR | 200468934 Y1 | * | 9/2013 | |
| KR | 20220088188 A | * | 6/2022 | |
| WO | WO 2004/111562 A2 | | 12/2004 | |
| WO | WO-2012133525 A1 | * | 10/2012 | ........... C04B 35/053 |
| WO | WO-2020104592 A1 | * | 5/2020 | ........... C21D 9/0025 |

* cited by examiner

TRANSPORTATION TRAY FOR TRANSPORTING AND HEATING CHEMICAL SUBSTANCES

CROSS-REFERENCE TO RELATED APPLICATIONS

This application is the U.S. National Stage of PCT/EP2021/051810, filed Jan. 27, 2021, which in turn claims priority to German patent application number 10 2020 000 510.1 filed Jan. 28, 2020. The content of these applications are incorporated herein by reference in their entireties.

FIELD

The present invention is in the technical field of the thermal conversion chemical substances in a furnace and relates to a transport tray suitable and intended for transporting and heating chemical substances. The invention further relates to the use of a transport tray according to the invention in the production of cathode materials for lithium-ion batteries.

BACKGROUND

Batteries are basically differentiated as primary and secondary energy storage devices. Whereas in primary energy storage devices, the chemical energy is irreversibly converted into electrical energy; secondary energy storage devices (accumulators) enable multiple use as a result of the possibility of reversing the chemical reaction taking place by supplying electrical energy. Secondary energy storage devices with an active cathode material based on lithium ions are used in a wide variety of applications. Examples include electric and hybrid vehicles, portable computers, mobile phones, and smart watches. Due to the widespread use of lithium-ion batteries, active cathode materials are required in large quantities. The quantities produced worldwide amount to more than 100,000 tons per year, with a rapidly increasing trend. Currently, it is common to use lithium mixed metal oxides with the transition metals nickel (Ni) manganese (Mn), and cobalt (Co) as the active cathode material. The most commonly produced cathode materials are lithium nickel cobalt manganese oxide ($LiNiCoMnO_2$) and lithium cobalt oxide ($LiCoO_2$); lithium nickel cobalt aluminum oxide ($LiNiCoAlO_2$) and lithium iron phosphate ($LiFePo_4$) are produced in lesser quantities.

In the large-scale production of cathode materials for lithium-ion batteries, the respective starting materials are transported in a transport tray through a continuous furnace and heated thereby to a temperature of several hundred degrees Celsius (e.g., 950° C.), resulting in chemical conversion to the desired product. The materials of the transport trays currently used are selected with a view to the high thermal shock resistance required for use.

However, practice has shown that these materials are subject to considerable corrosion. The reason for this is the chemical aggressiveness of the substances transported in the transport tray, which increasingly attack the material of the transport trays at the high temperatures. Especially in the production of lithium nickel cobalt manganese oxide, very severe corrosion of the transport trays occurs due to the particularly aggressive transition metals. This disadvantageously results in the fact that the transport trays only allow a relatively low number of firing cycles and then have to be replaced. For example, in the production of lithium nickel cobalt manganese oxide, a transport tray can usually only be used for 20 to 40 firing cycles. A further complication is that, after use, the transport trays have residues of the cathode powder, which must generally be classified as hazardous waste such that complex and expensive disposal of the transport trays is required. This results in considerable additional costs and is ecologically undesirable. In addition, materials from the transport tray contaminate the material to be fired leading to its contamination and reducing its quality, overall.

DE 10 2005 024 957 A1 discloses a multipart, thin-walled crucible with an insert made of quartz glass fabric or quartz glass felt for cooling Si melts.

EP 0 452 718 B1 discloses an annealing basket for the heat treatment of filling charge arranged therein with a base and side walls made of carbon-fiber-reinforced carbon.

DE 10 2011 052 016 A1 discloses a kit for a melting crucible to accommodate molten material, for example, molten silicon.

Supports for components to be subjected to a heat treatment process are described in WO 2004/111562 A2.

SUMMARY

The object of the present invention consists in improving transport trays known in the prior art such that the transport trays have high thermal shock resistance with, at the same time, good corrosion resistance and can thus be used a greater number of times than transport trays known in the prior art.

These and further objects are accomplished according to the proposal of the invention by a transport tray for a furnace, in particular a continuous furnace or a bogie hearth furnace, in accordance with the features of the independent claim. Advantageous embodiments of the invention are indicated by the features of the dependent claims.

According to the invention, a transport tray for a furnace, in particular a continuous furnace or a bogie hearth furnace, is shown. The transport tray serves as a tray-shaped container for transporting chemical substances, wherein the substances (starting materials) transported in the transport tray are to be converted into a chemical product by heating in the furnace in the transport tray. In principle, any starting materials can be converted into a chemical product in the transport tray according to the invention. Particularly advantageously, these are starting materials for producing an active cathode material of a lithium-ion battery, which is, in particular, a lithium mixed metal oxide with the transition metals nickel (Ni), manganese (Mn), and Cobalt (Co), described by the general formula $LiNi_xMn_yCo_zO_2$ with $x+y+z=1$. In the preceding formula, nickel, manganese, and cobalt can each be present alone or in any combination.

The transport tray according to the invention for transporting and heating chemical substances comprises a support structure with a preferably flat base and a frame fixedly connected thereto. According to the invention, the base and the frame of the support structure are formed in one piece and cannot be detachably separated from one another nondestructively.

The transport tray further comprises a lining (wall or perimeter) of a tray-shaped cavity, which serves to accommodate the chemical substances. The lining is supported by the support structure. The lining comprises a base plate placed on the base and a plurality of frame plates attached to the frame (i.e., fixed on the frame). Preferably, the frame plates are clamped against the frame.

The base plate is supported by the support structure such that it has, relative to the plate plane of the base plate, free space (clearance) at least in two orthogonal directions such that its thermal expansion in the plate plane is not impeded. In other words, the base plate is supported by the support structure such that its thermal expansion is not impeded in the plate plane. Advantageously, the base plate is supported by the base of the support structure. Preferably, the base plate has free space all around in the plate plane. For this purpose, the base plate is supported by the support structure such that it has sufficient play (i.e., clearance) in the plate plane such that its thermal expansion is not impeded.

In addition, each frame plate is fixed on the frame, preferably clamped against the frame, such that it has free space (clearance) in the plate plane at least in two orthogonal directions such that its thermal expansion is also not impeded. In other words, each frame plate is supported by the support structure such that its thermal expansion in the plate plane is not impeded. Advantageously, each frame plate is clamped against the frame. For this purpose, each frame plate is supported by the support structure such that it has sufficient play (i.e., clearance) in the plate plane such that its thermal expansion is not impeded.

As a result of the special design of the lining of the tray-shaped cavity of the transport tray, in which the thermal expansions of the base and frame plates are not adversely affected, it is possible to avoid thermally induced mechanical stresses that, otherwise, make material breakage probable. The lining can thus be made of a material that has good corrosion resistance without the risk of material breakage due to the rather low thermal shock resistance typical in these materials. Materials with low thermal shock resistance can break more easily in the case of thermally induced mechanical stresses. In contrast, the material of the support structure, which is protected against corrosion by the lining can be selected in light of the desired high thermal shock resistance. Thus, the transport tray according to the invention can advantageously be used far more times than conventional transport trays before it has to be replaced. For example, transport trays according to the invention can be used for the same use at least 100 times as often as conventional transport trays.

The materials used for the lining can be selected to be highly corrosion resistant. Thermal shock resistance is achieved through the structural design of the lining.

In terms of thermal shock resistance, a low wall thickness of the lining is advantageous. Preferably, the wall thickness of the base and frame plates is in the range from 1.5 mm to 8.0 m, particularly preferably in the range from 2.0 mm to 5.0 mm. In particular, the frame plates can even be implemented as a film with a wall thickness in the range from 0.3 mm to 2.5 mm. The thickness of the support structure is advantageously in the range from 6 to 12 mm and is preferably 7 mm.

The following formula clarifies the relationships:

$$I(TWB)=(MOR \times TC):(MOE \times CTE \times T)$$

where the abbreviations have the following meaning
I(TWB): indicator of thermal shock resistance
MOR: modulus of rupture (flexural strength), unit: N/mm$^2$
TC: thermal conductivity, unit: W/m*K
MOE: Young's modulus, unit: N/mm$^2$
CTE: coefficient of thermal expansion, unit: 1/K
T: plate thickness, unit: m In the above formula, I (TWB) is an indicator of the thermal shock resistance of a material. The greater the value I (TWB), the better the thermal shock resistance, and vice versa. Accordingly, the thermal shock resistance is, in particular, inversely proportional to the plate thickness T, in other words, the lower the plate thickness T, the greater the thermal shock resistance.

The lining of the tray-shaped cavity or parts thereof can be exchanged separately, with the support structure generally continuing to be usable. The costs for the production of substances when using transport trays according to the invention can thus be significantly reduced. In addition, there is considerably less hazardous waste for disposal. Furthermore, the contamination of the material to be fired is reduced such that its quality is improved.

The base plate of the lining can be implemented in one piece or in multiple pieces. Preferably, the base plate is implemented in one piece. In the case of a multipart design of the base plate, it is composed, for example, of multiple strips. Likewise, each frame plate can be implemented in one or multiple pieces, a one-piece design being preferred.

The transport tray is advantageously designed such that no parts that are not part of the lining protrude into the tray-shaped cavity, in particular no screws that are used to fasten the frame plates.

According to an advantageous embodiment of the transport tray according to the invention, the frame plates are clamped to the frame of the support structure by clamping strips. Advantageously, two adjacent frame plates are clamped against the frame by one clamping strip. Preferably, clamping strips have, in each case, grooves for accommodating edge regions of the frame plates. The edge regions of the frame plates adjacent a clamping strip are accommodated with play in the grooves of the clamping strips in order to enable thermal expansion of the frame plates. The clamping strips for clamping the frame plates are advantageously clamped to the frame by threaded screws or spring elastic clips made of an inert ceramic material. The threaded screws or clips used are heat and corrosion resistant. Preferably, the threaded screws and clips are made of a ceramic material, such as zirconium oxide, magnesium oxide, aluminum oxide, or mixtures thereof, it being preferable for this material to have a proportion of at least 80%. Advantageously, the clamping strips are in each case clamped to a corner section of the frame. The clamping strips can also be referred to as corner parts.

According to an advantageous embodiment of the transport tray, the clamping strips contain aluminum/magnesium spinel, yttrium oxide ($Y_2O_3$), cerium oxide ($CeO_2$), hafnium oxide, aluminum oxide ($Al_2O_3$), zirconium oxide ($ZrO_2$), magnesium oxide (MgO), or mixtures thereof, preferably at a rate of at least 80%, particularly preferably at least 90%. In particular, the clamping strips can be made of aluminum oxide ($Al_2O_3$), zirconium oxide ($ZrO_2$), magnesium oxide (MgO), or mixtures thereof.

According to another advantageous embodiment of the transport tray according to the invention, the frame of the support structure is a closed or perimetral frame. Preferably, the perimetral frame of the support structure has plate-shaped frame sections. For example, the frame has a rectangular or square shape with, in each case, two opposing (parallel) frame sections. For example, frame sections adjacent one another are connected to one another by an (oblique) corner section, with the corner section being arranged at an angle greater than 0° and less than 90° relative to each of the two adjacent frame sections.

Preferably, at least one plate-shaped frame section of the frame of the support structure has at least one cutout, in particular exactly one cutout. Advantageously, all plate-shaped frame sections have, in each case, at least one cutout, in particular exactly one cutout. By means of the at least one cutout, weight and material, as well as manufacturing costs, for the transport tray can be saved. Another advantage obtained thereby is improved heat transfer to the material be fired in the region of the cutout, which reduces the disadvantage of the typically rather poor thermal conductivity of materials with good corrosion resistance. In addition, the thermal load on the lining can be reduced.

Preferably, the at least one cutout of a plate-shaped frame section of the support structure extends over at least 50%, at least 60%, at least 70%, at least 80%, or at least 90% of the area of the plate-shaped frame section of the frame, with an increasingly greater expanse of the cutout being associated with better heat transfer and greater savings in material and costs.

The at least one cutout of the plate-shaped frame section of the support structure can be an internal cutout, i.e., is completely surrounded by material of the frame section. In this case, the associated frame plate of the lining continues to be well protected against mechanical stress by the frame section of the support structure and can, consequently, be implemented with extremely thin walls. For example, the wall thickness of the frame plate is in the range from 0.3 mm to 8.0 mm. In the case of a particularly thin-walled frame plate, the wall thickness is, for example, in the range from 0.3 mm to 2.0 mm.

In an alternative embodiment, the at least one cutout of the plate-shaped frame section of the support structure is an edge cutout. By further enlargement of the expanse of the cutout, this enables even further improvement of the heat transfer to the material to be fired as well as further savings in material and costs.

According to another advantageous embodiment of the transport tray according to the invention, the base of the support structure has a plurality of holes. By this measure, a further savings of material and costs of the transport tray can be achieved. In addition, the heat transfer to the material to be fired can be further improved. A further important advantage of this embodiment is that the thermal load on the lining can be reduced.

According to another advantageous embodiment of the transport tray according to the invention, the frame of the support structure is not closed, but, instead, is interrupted at least once and comprises a plurality of pillars that are designed, in particular, as corner pillars. The frame is completely removed between the pillars by edge cutouts. In this case, the support structure consists of the base and the pillars forming the frame. By this measure, an even further savings of material and costs of the transport tray can be achieved. In addition, the heat transfer to the material to be fired can be further improved.

According to another advantageous embodiment of the transport tray according to the invention, the frame plates are in each case seated on the base plate. The base plate can thus be fixed in the direction perpendicular to the plate plane without impeding the thermal expansion of the base plate in the plate plane.

According to another advantageous embodiment of the transport tray according to the invention, wedge-shaped corner strips are provided for covering respective abutting edges between the frame plates and the base plate. The corner strips can prevent penetration of the material to be fired into the region of the abutting edges between the frame plates and the base plate, in order to thus reliably and safely protect the support structure against corrosion.

According to another advantageous embodiment of the transport tray according to the invention, the base plate extends beyond the frame plates in the plate plane. The base plate is clamped by the frame plates against the base of the support structure, with the thermal expansion of the base plate not being adversely affected.

According to another advantageous embodiment of the transport tray according to the invention, the support structure and the lining of the tray-shaped cavity are made of materials different from each other, which are preferably selected such that, relative to the chemical reaction to a same product, the material of the lining is more corrosion resistant than the material of the support structure. As a result, the transport tray can be used more times, i.e., the number of firing cycles before replacement due to corrosion is increased. The material of the lining can thus be specifically selected in light of the corrosion stability during the conversion of certain starting materials to a chemical product, as a result of which the number of uses is increased. Advantageously, the material of the support structure is selected with a view to good thermal shock resistance. However, it is also possible for the support structure and the lining to be made of the same material.

According to an advantageous embodiment of the transport tray, the lining contains aluminum/magnesium spinel, yttrium oxide ($Y_2O_3$), cerium oxide ($CeO_2$), hafnium oxide, aluminum oxide ($Al_2O_3$), zirconium oxide ($ZrO_2$), magnesium oxide (MgO), or mixtures thereof, preferably at a rate of at least 80%, particularly preferably at least 90%. In particular, the transport tray can be made of aluminum oxide ($Al_2O_3$), zirconium oxide ($ZrO_2$), magnesium oxide (MgO), or mixtures thereof.

According to an advantageous embodiment of the transport tray, the support structure contains or is made of a material selected from cordierite, mullite, a cordierite/spinel/mullite mixture, R—SiC, N—SiC, S—SiC, Si—SiC, oxidically bonded SiC, or mixtures thereof. It is also possible for the support structure to contain or be made of graphite.

The transport tray according to the invention can, in principle, be used for the production of any chemical products in which transport of the transport tray through a furnace, in particular a continuous furnace, and a chemical reaction of starting materials situated in the transport tray by heating in the furnace occur. The transport tray is particularly advantageously used in the production of a (lithium-ion-based) active cathode material of a lithium-ion battery.

The invention also extends to the use of the transport tray according to the invention for producing a cathode material of a lithium-ion battery, in particular a lithium mixed metal oxide with the transition metals nickel (Ni), manganese (Mn), and cobalt (Co), described by the general formula $LiNi_xMn_yCo_zO_2$ mit x+y+z=1.

The various embodiments of the invention can be implemented individually or in any combinations. In particular, the features mentioned above and to be explained below can be used not only in the combinations indicated, but also in other combinations or in isolation without departing from the scope of the present invention.

BRIEF DESCRIPTION OF THE DRAWINGS

The invention is now explained in detail using exemplary embodiments, with reference to the accompanying drawings. They depict in simplified, not-to-scale representation.

DETAILED DESCRIPTION

Figure 1:
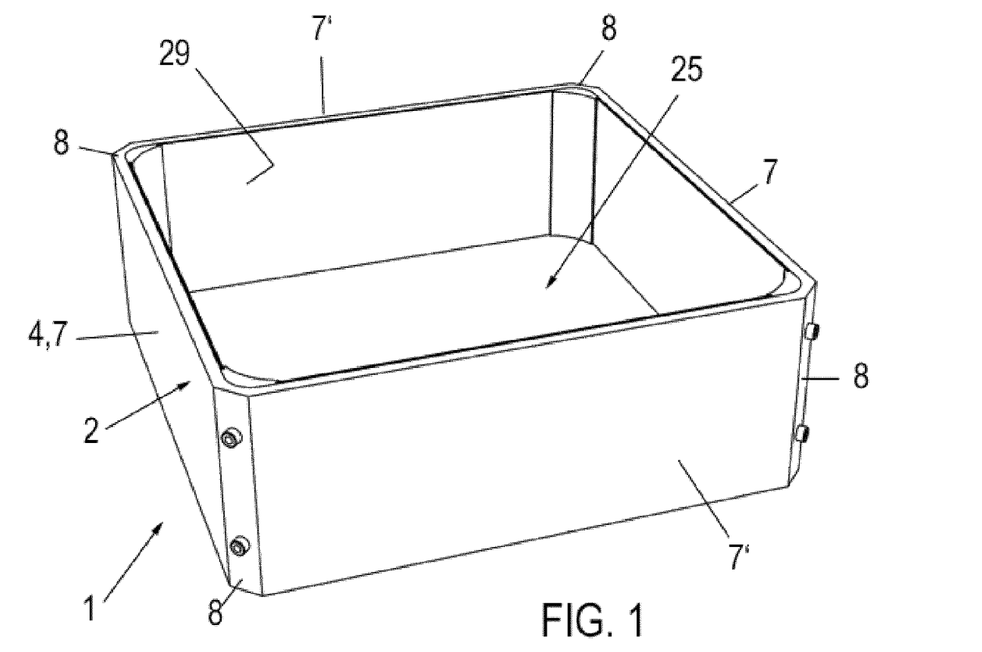
FIG. 1-9 different representations to illustrate a first exemplary embodiment of the transport tray according to the invention.

Reference is first made to FIG. 1 through 9, wherein a first exemplary embodiment of the transport tray according to the invention is shown in different views. FIG. 1 depicts the transport tray designated as a whole with the reference number 1 in a perspective view from above. FIG. 2 through 9 also depict in each case details or components of the transport tray 1. The transport tray 1 is used for the transport and the heating of chemical substances in a furnace, for example, in a continuous furnace. Typically, a continuous furnace includes a roller bed with actively driven rollers that, together, form a transport surface for supporting and transporting the transport tray 1 from a furnace entrance to a furnace exit. Since the specific structure of a continuous furnace is not necessary for the understanding of the invention, its description is superfluous.

Figure 2:
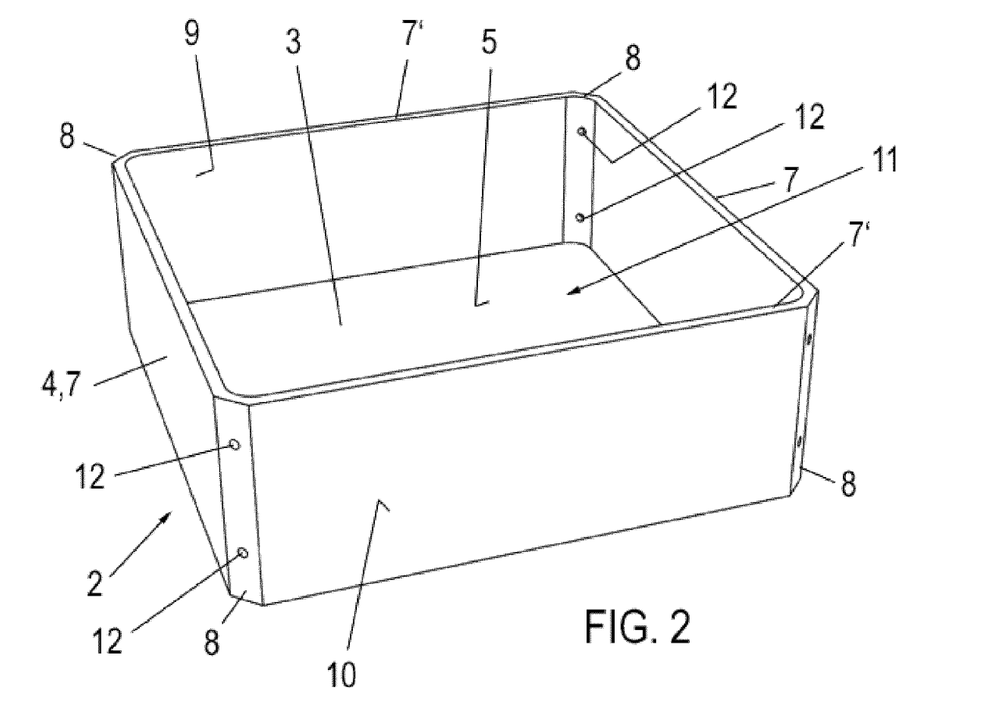

The transport tray 1 shown in FIG. 1 includes an outer support structure 2, depicted in FIG. 2 in a separate representation. The support structure 2 is a rigid body implemented in one part or one piece. The support structure 2 is composed of a base 3 and a frame 4, wherein the base 3 and the frame 4 are fixedly connected to one another due to the one-piece nature of the support structure 2 and cannot be detached from one another in a nondestructive manner. In the practical use of the transport tray 1, the base 3 typically has a horizontal orientation; the frame 4, a vertical orientation. In the present exemplary embodiment, the frame 4 is a closed or perimetral frame. Here, the support structure 2 consisting of the base 3 and the frame 4 form an outer capsule, so to speak.

The base 3 has a typically flat front (upper) base surface 5 and a back (lower) base surface 6. The back base surface 6, which is also the base surface of the support structure 2, is used to set the transport tray 1 on a base. In the present exemplary embodiment, the support structure 2 has a continuous (i.e., not interrupted and or continuous) base 3, implemented here, for example, in the form of a flat plate and extending in a planar manner over the entire lower region of the support structure 2 all the way to the frame 4. The continuous base 3 has no opening.

The frame 4 is substantially rectangular in shape and can be mentally subdivided into two frame sections 7 or 7' opposite one another in each case (parallel to one another) that are connected to one another by corner sections 8 arranged obliquely relative thereto. In this embodiment, the support structure 2 has a closed or perimetral (i.e., uninterrupted) frame 4. Here, the frame sections 7, 7' are, for example, each plate-shaped and flat. A respective corner section 8, which connects two adjacent frame sections 7, 7' to one another, is arranged at an angle of 45° relative to the frame sections 7, 7'. The frame 4 has an inside frame surface 9 and an outside frame surface 10.

The corner sections 8 of the frame 4 of the support structure 2 have, in each case, openings 12, implemented here, for example, in the form of round holes. In the example depicted in FIG. 2, the corner sections 8 have, in each case, two openings 12, with the equal possibility of providing a larger or smaller number of openings 12.

The front base surface 5 and the inside frame surface 9 jointly delimit an inner region 11 (here, a tray space open towards the top) of the support structure 2, which serves to accommodate elements of a lining 29 for the tray-shaped cavity 25 of the transport tray 1, which is explained in more detail below.

Figure 3:
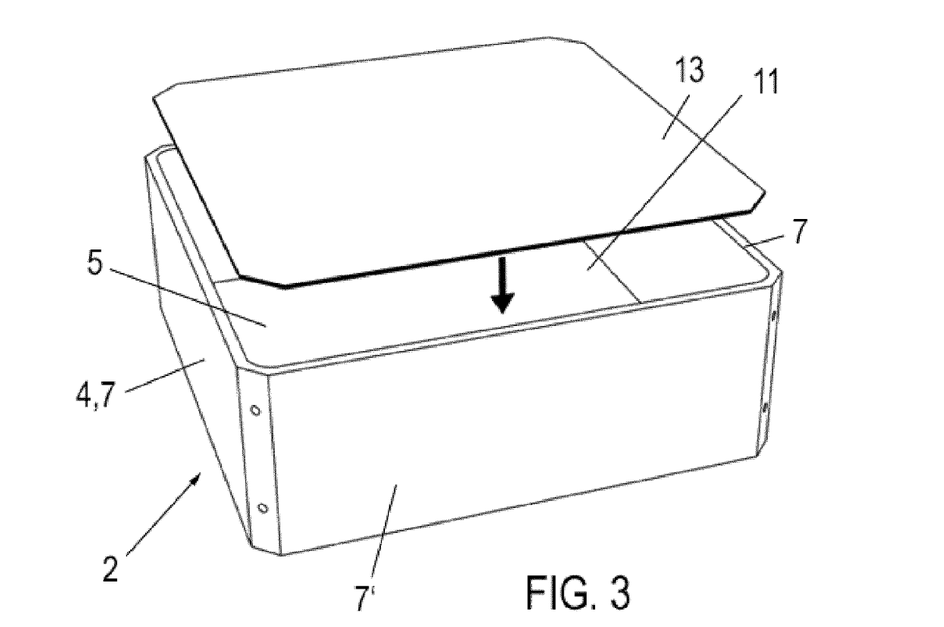
Figure 4:
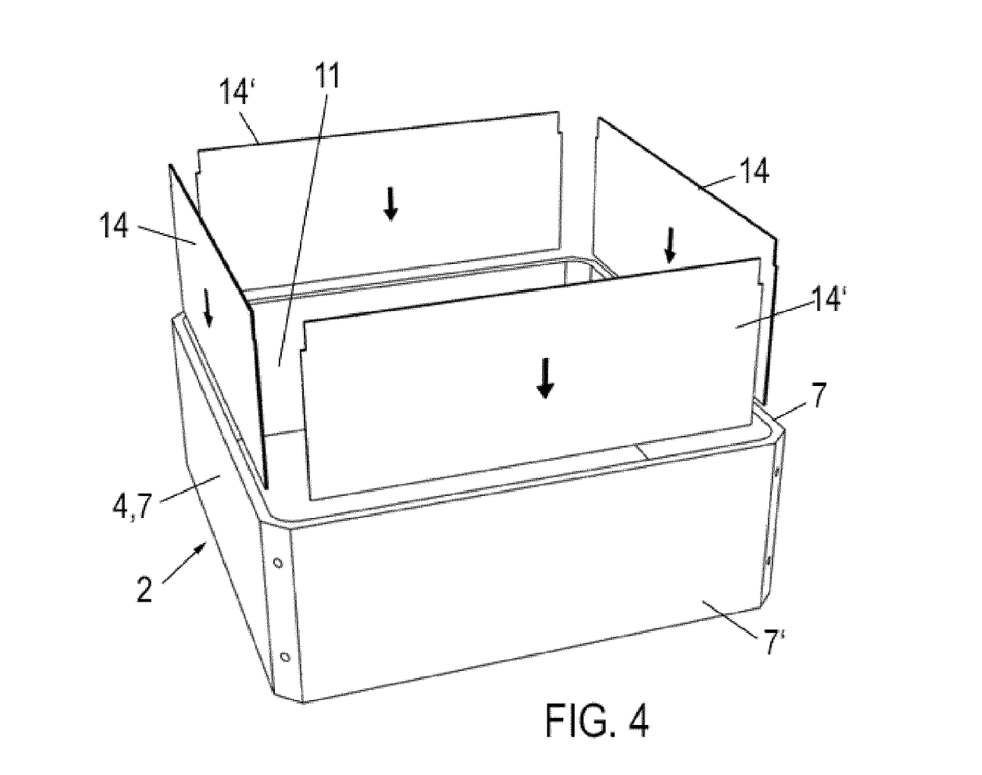

Reference is now made to FIGS. 3 and 4, wherein the insertion of various inserts into the inner region 11 of the support structure 2 is illustrated. The inserts form the lining 29, which surrounds the tray-shaped cavity 25 of the transport tray 1. Accordingly, a base plate 13 is placed on the front base surface 5 and multiple frame plates 14, 14' are placed adjacent the frame sections 7, 7' of the inside frame surface 9. In FIGS. 3 and 4, the insertion procedure is illustrated using arrows. The base plate 13 rests freely on the base 3. The frame plates 14, 14' are clamped against the frame 4, which is described in greater detail below. Here, the base plate 13 and the frame plates 14, 14' have, for example, in each case, the form of flat plates that have no opening. It would also be conceivable for the base plate 13 to be implemented in multiple parts and to be composed, for example, of multiple strips.

Figure 5:
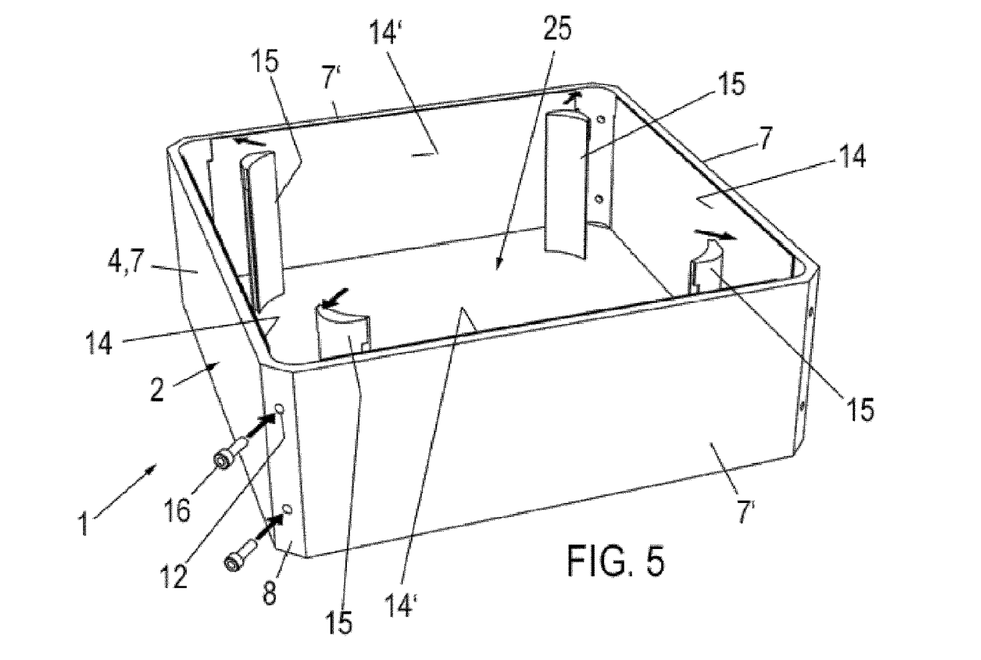

FIG. 5 depicts the transport tray 1 in an intermediate state of assembly in a perspective view obliquely from above. FIG. 5 illustrates in particular the attachment of the frame plates 14, 14' to the frame 4. Corner parts 15 that are placed in the region of the corner sections 8 on the edge regions 17, 17' of two directly adjacent frame plates 14, 14' are provided for the attachment of the frame plates 14, 14' to the frame 4. The placement of the corner parts 15 on the corner sections 8 is illustrated by arrows in FIG. 5.

The corner parts 15 are attached on the frame 4 in each case by threaded screws 16 that are guided from the outside through the openings 12 of the corner sections 8 of the frame 4 and screwed to the corner parts 15. For this purpose, the corner parts 15 are provided with blind (nonpenetrating) holes, in each of which a thread for the screwing of the threaded screws 16 is formed. The blind holes and their thread are not shown in detail in the figures.

Blind holes as described here represent a particularly good solution from a technical standpoint. It would also be conceivable to provide through-holes (which is more economical) instead of blind holes, in which case the threaded screws 16 would then have to be secured with nuts. However, it is disadvantageous with this solution that the nuts protrude into the tray-shaped cavity 25 of the transport tray 1, as they are exposed to the corrosive attack of the chemically aggressive substances. In order to avoid this, it would be conceivable to provide, in the corner part 15 for a respective threaded screw 16, a recess that accommodates the threaded screw and the associated nut. In general, it is advantageous for no components not belonging to the lining to protrude into the tray-shaped cavity 25, such as the threaded screws 16.

The frame plates 14, 14' are clamped against the inside frame surface 9 by the corner parts 15. The base plate 13 is not attached to the base 3, but, instead, rests freely thereon. However, the base plate 13 can be fixed perpendicular to the base 3 by means of clamping by the frame plates 14, 14'. The fully assembled transport tray 1 is depicted in FIG. 1.

Figure 6:
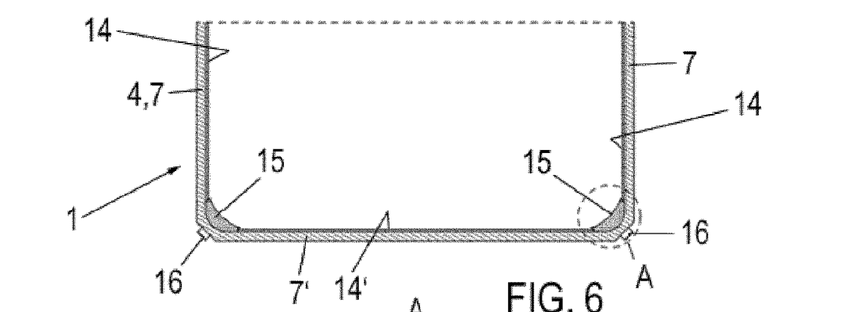

FIG. 6 depicts a horizontal section (parallel to the base 3) of the fully assembled transport tray 1. One corner region of the transport tray 1 is marked by the dashed circle A. The marked corner region A of the transport tray 1 of FIG. 6 is depicted in FIG. 7 in a greatly enlarged view.

Figure 7:
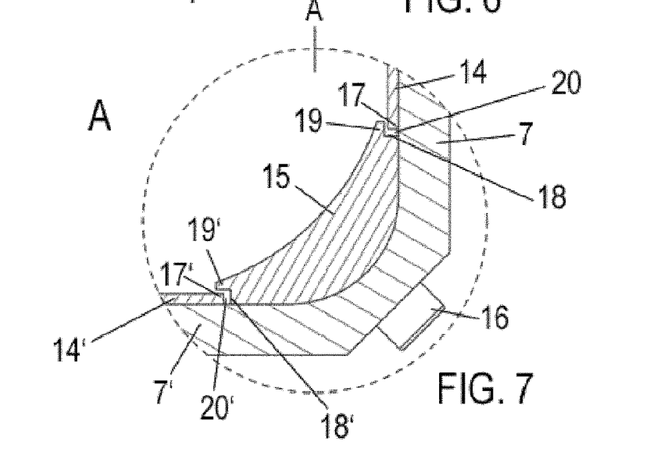

As can be seen in FIG. 7, the corner part 15 overlaps respective edge regions 17, 17' of the adjacent frame plates 14, 14'. For this purpose, the corner part 15 is provided on both sides with grooves 18, 18', in which the edge regions 17, 17' of the frame plates 14, 14' are accommodated. The grooves 18, 18' have in each case a strip-shaped protrusion 19, 19' that overlaps the associated edge region of the associated edge region 17, 17' of the frame plates 14, 14'.

It is essential here that the edge regions 17, 17' of the frame plates 14, 14' are in each case accommodated with play in the associated groove 18, 18', i.e., they do not completely fill the grooves 18, 18'. Accordingly, there is a free space ("clearance") between a respective edge region 17, 17' of the frame plates 14, 14' and the corner part 15 within the grooves 18, 18'. These free spaces 20, 20' are formed in the perimetral direction of the frame 4 (i.e., in the plane of the frame plates 14, 14' and in the perimetral direction of the frame 4). The frame plates 14, 14' thus have in each case, relative to their plate plane, a clearance in at least two orthogonal directions such that thermally induced expansion of the frame plates 14, 14' without obstruction is possible. In other words, the frame plates 14, 14' are in each case accommodated in the grooves 18, 18' such that thermal expansion of the frame plates 14, 14' in the plate planes is possible.

Advantageously, a width of the free spaces 20, 20' measured in the perimetral direction of the frame 4 is only large enough that thermal expansion of the frame plates 14 without obstruction is possible, but excessive contamination is prevented. Preferably, the width of the free spaces 20, 20' is at most 2.5 mm.

Figure 8:
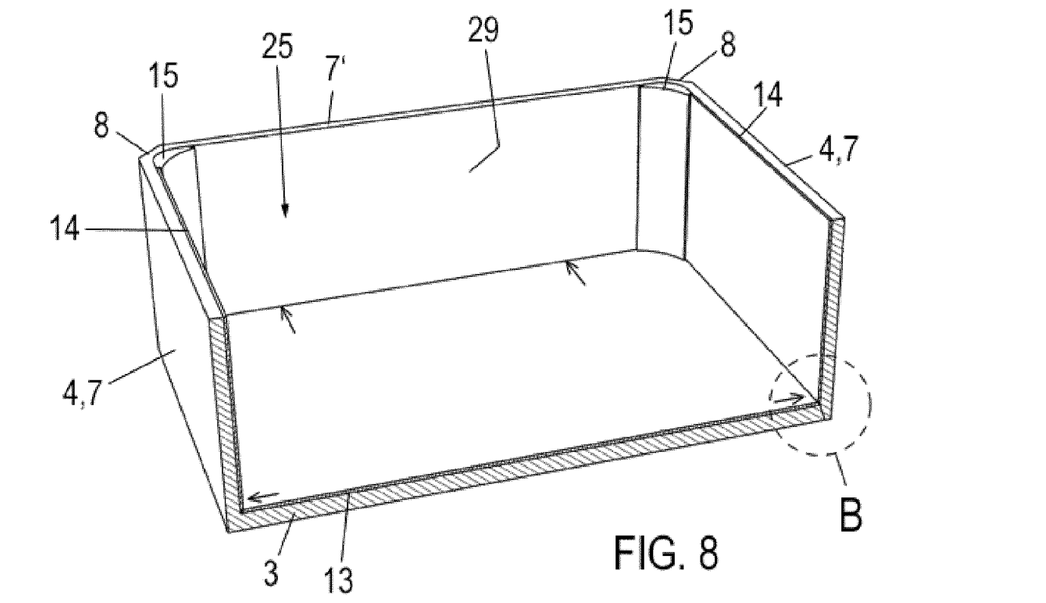
Figure 9:
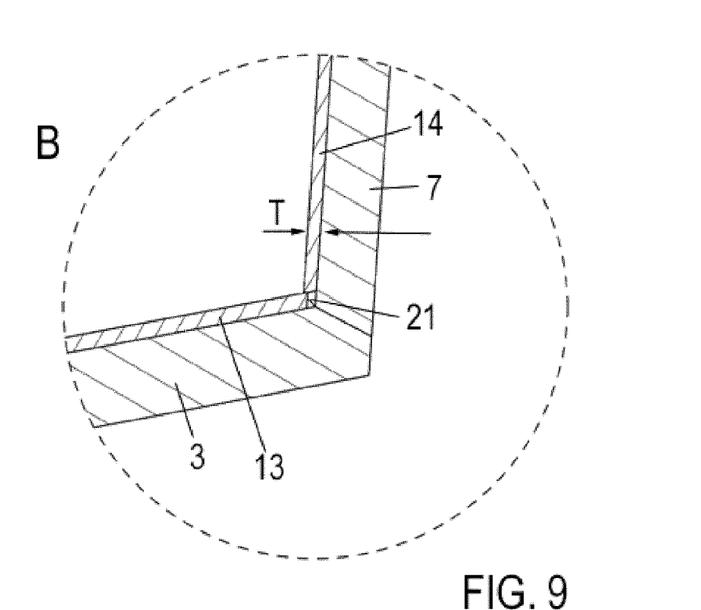

Reference is now also made to FIGS. 8 and 9, wherein FIG. 8 depicts a sectional view of the transport tray 1 perpendicular to the plane of the base 3 and FIG. 9 shows an enlarged sectional view according to the region B marked in FIG. 8.

Accordingly, the base plate 13 is also accommodated with play within the inner region 11 of the support structure 2, wherein a perimetral gap 21 (i.e., a free space) remains between the base plate 13 and the frame sections 7, 7'. The base plate 13 thus has, relative to its plate plane, clearance in at least two orthogonal directions (even perimeterally here) such that thermally induced expansion of the base plate 13 is not impeded. The thermally induced expansion of the base plate 13 is represented schematically by arrows in FIG. 8. In other words, the base plate 13 is supported by the support structure 2 with sufficient play to allow thermal expansion in the plate plane.

In the exemplary embodiment depicted, the frame plates 14, 14' have in each case a width T measure perpendicular to the gap 21 (see FIG. 9), which is greater than the width of the gap 21 such that the frame plates 14, 14' cannot penetrate into the gap 21, but, instead, are seated on the base plate 13. The width T of the frame plates 14, 14' is measured parallel to the plane of the base 3 and is the shortest dimension perpendicularly through the frame plates 14, 14'. By means of the frame plates 14, 14' seated on the base plate 13, fixation of the base plate 13 in the direction perpendicular to the base 3 can be achieved without adversely affecting the thermal expansion of the base plate 13 in the plate plane.

By means of the base plate 13 and the frame plates 14, 14', and, here, the corner parts 15 as well, the inner region 11 of the support structure 2 is completely lined, i.e., the base plate 13 and the frame plates 14, 14', as well as the corner parts 15, together form a complete lining 29 (i.e., a wall) of a tray-shaped cavity 25 of the transport tray 1. The cavity 25 is used to accommodate starting materials, which are to be converted into a chemical product by heating in a furnace, e.g., a continuous furnace. For this purpose, the transport tray 1 is placed in the furnace on the back base surface 6, in particular transported through the furnace. The lining 29 can be nondestructively removed from the support structure 2.

The transport tray 1 is particularly advantageously used for producing an active cathode material of a lithium-ion battery, in particular a lithium mixed metal oxide with the transition metals nickel (Ni), manganese (Mn), and cobalt (Co), described by the general formula $LiNi_xMn_yCO_zO_2$ mit $x+y+z=1$. It would, however, also be conceivable to use the transport tray 1 for the production of other substances, for example, color pigments.

The transport tray 1 can solve the problems mentioned in the introduction in connection with the required high thermal shock resistance with, at the same time, good corrosion resistance of the transport tray 1. Advantageously, the support structure 2 and the lining 29 can be made of different materials according to their function. The support structure 2 is well protected against corrosion by the lining 29 such that the material of the support structure 2 can be selected essentially in light of its thermal shock resistance and strength. For the support structure 2, corrosion resistance is of rather secondary importance. In contrast to this, the lining 29 must be quite corrosion resistant and thermal shock resistant, with corrosion resistance being achieved by the specific selection of material and temperature resistance being achieved by the structural design of the lining 29. Particularly advantageously, the thermal expansions of both the base plate 13 and the frame plates 14, 14' are not impeded in their respective plate planes such that no detrimental high mechanical stresses build up that can ultimately result in the breakage of the transport tray 1.

The support structure 2 and the lining 29 of the support structure 2 are advantageously made of materials different from each other, with the lining 29 preferably made of a material that is more corrosion resistant relative to the chemical reaction of the same product than the material of the support structure 2.

The support structure 2 is preferably made of a high strength, thermal-shock-resistant material with a relatively low material thickness and a relatively low weight. Preferably, the support structure 2 contains or is made of a material selected from R—SiC, N—SiC, S—SiC, Si—SiC, oxidically bonded SiC, or mixtures thereof. The support structure 2 can, for example, also be made of cordierite, mullite, or a cordierite/spinel/mullite mixture. These are materials with high strength, low thermal expansion, and excellent thermal shock resistance; however, in the case of SiC rather low corrosion resistance, which is, however, harmless, since the support structure 2 is well protected against corrosion by the lining 29.

The lining 29 preferably contains aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof, with the content of these substances preferably at least 80%, particularly preferably at least 90%. In particular, the lining 29 can also be made of these substances. Aluminum oxide that is as pure as possible, which is ideally densely fired, is a material with particularly good corrosion resistance, but rather low thermal shock resistance. These materials can be cast, pressed, or manufactured in plasma or tape casting processes.

Preferably, the frame plates 14, 14' and/or the base plate 13 have in each case a relatively thin wall thickness in the range from 1.5 mm to 5 mm and are, for example, designed as a film.

The support structure 2 can, due to the good protection against corrosion by the lining 29 and being made of at least one of the materials mentioned with good thermal shock resistance, be used very many times. For example, the service life of the support structure 2 can be more than 1000 cycles. The lining 29 can be removed from the support structure 2 nondestructively and can, consequently, be replaced separately in a simple manner if it is corroded and can easily be recycled. Since the material of the lining 29 can be specifically selected for corrosion resistance and the thermal shock resistance of the lining 29 is ensured by its structural design, the lining 29 can also be used for a very large number of firing cycles without needing to be replaced.

Equally, the base plate 13 and the frame plates 14, 14' can be made of materials different from one another, with the base plate 13 advantageously being made of a material that is more corrosion resistant relative to the chemical reaction of the same product than the material of the frame plates 14, 14'. Preferably, the base plate 13 contains at least 80%, particularly preferably at least 90% aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof. The base plate 13 can also be made of these materials. The base plate 13 can also have a coating containing one of these materials or mixtures thereof.

Preferably, the frame plates 14, 14' are made of a material selected from the group consisting of aluminum oxide, zirconium oxide, magnesium oxide, R—SiC, N—SIC, S—SiC, and Si—SiC, or mixtures thereof. For example, the frame plates 14, 14' can also be made of cordierite or a cordierite/spinel/mullite mixture.

It goes without saying that the base plate 13 and the frame plates 14, 14' can also be made of the same material, which is preferably at least 80%, particularly preferably at least 90%, aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof. The base plate 13 and the frame plates 14, 14' can also have a coating containing one of these materials or mixtures thereof.

The base plate 13 and the frame plates 14, 14', as well as the corner parts 15, can be replaced separately. For example, the base plate 13 can be replaced separately if it should be more corroded than the frame plates 14, 14'. As a result, costs and material can be saved. Similarly, simple cleaning of the base plate 13 or the frame plates 14, 14' is possible, for example, by sandblasting. It would also be conceivable to form the base plate 13 in multiple parts, for example, in strips. In this case, separate replacement of strips would also be possible.

Reference is now made to FIG. 10 through 19, where, further exemplary embodiments of the transport tray 1 according to the invention are illustrated, using different views. In order to avoid unnecessary repetitions, only the differences from the above-described exemplary embodiment of FIG. 1 through 9 are explained and, otherwise, reference is made to the statements above.

Figure 10:
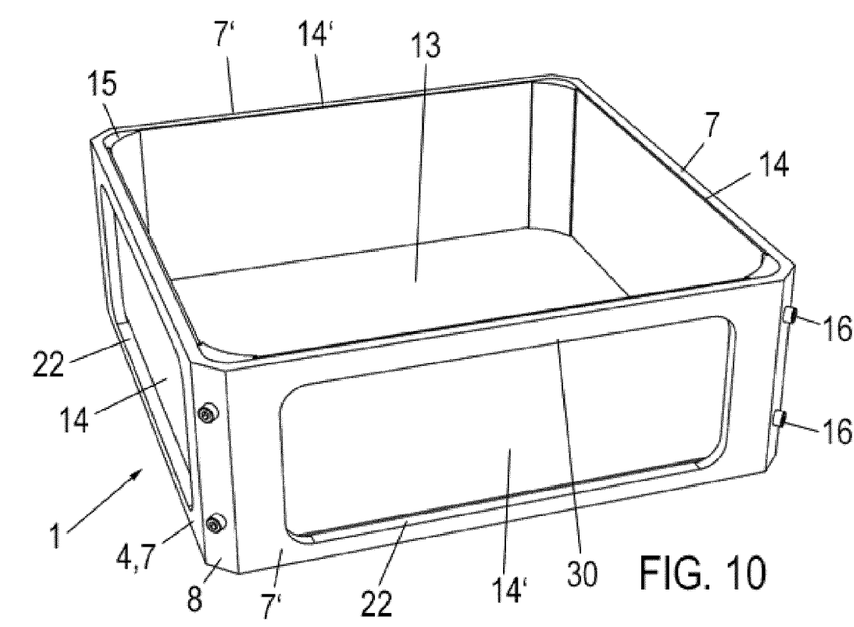
FIG. 10-11 different views of another exemplary embodiment of the transport tray according to the invention.
Figure 11:
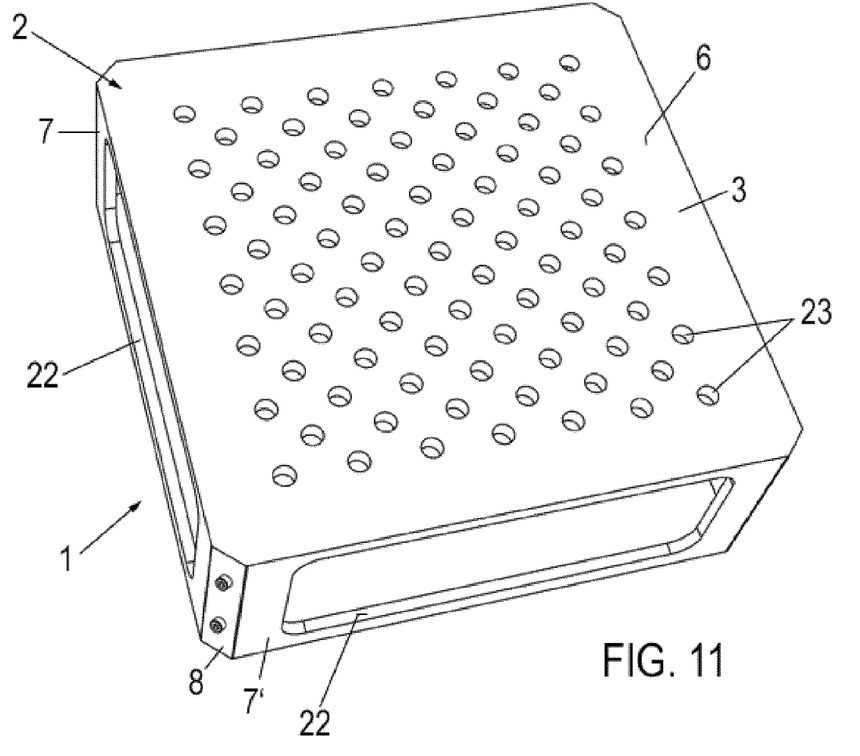

Considering FIGS. 10 and 11 first: FIG. 10 depicts another embodiment of the transport tray 1 in a perspective view obliquely from above; FIG. 11 depicts the underside of the transport tray 1.

Accordingly, the frame sections 7, 7' of the frame 4 of the support structure 2 (but not the frame plates 14, 14') are provided in each case with a cutout 22, here, for example, almost rectangular. The cutouts 22 extended in each case over a large part (preferably at least 50%) of the area of the associated frame section 7, 7'.

As shown in FIG. 11, the base 3 of the support structure 2 (but not the base plate 13) is additionally provided with a large number of holes 23. The weight of the transport tray 1 can be reduced by the cutouts 22 and the holes 23. In addition, material and costs for the support structure 2 can be saved.

A further advantage results from the improved heat transfer to the material to be fired. In particular, this can advantageously reduce the disadvantage of relatively poor thermal conductivity of, for example, aluminum-oxide-rich materials. For this purpose, the frame plates 14, 14' advantageously have a relatively low wall thickness. Advantageously, the cutouts 22 are large in their expanse relative to the area of the associated frame section 7, 7'. Heat can thus be transferred without great delay to the material to be fired.

Here, for example, the cutouts 22 of the frame sections 7, 7' are in each case completely surrounded by the material of the associated frame section 7, 7, i.e., the cutouts 22 in each case implemented internally. This has the advantage that a frame web 30 is present at the opening of the tray-shaped cavity 25 of the transport tray 1, which serves as an abutting edge for the frame plates 14, 14' and protects them from damage, e.g., during filling, emptying, and cleaning of the transport tray 1 and, in general, during any handling outside the firing process.

This makes it possible, particularly advantageously, to use frame plates 14, 14' with particularly low wall thickness, which, for example, can also be implemented as a film with a low wall thickness of, for example, 1.5 mm. Likewise, due to the low mechanical load, frame plates 14, 14' and a base plate 13 with low strength and high porosity can be used here. These enable increased oxygen and energy transport to the material to be fired.

Figure 12:
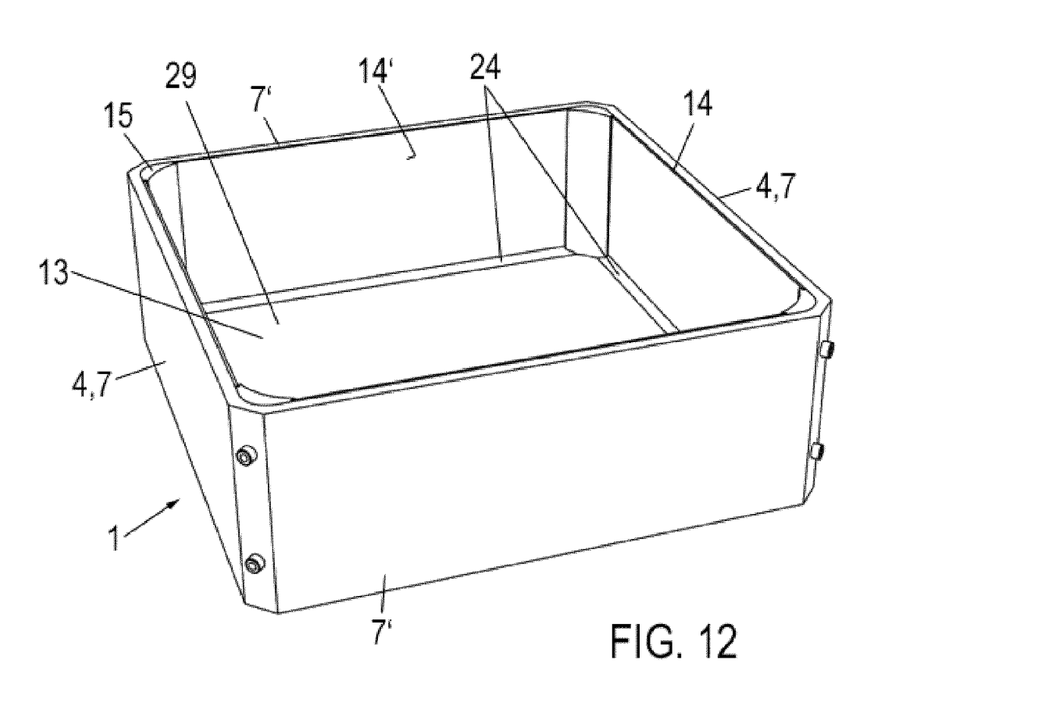
FIG. 12-13 different views of another exemplary embodiment of the transport tray according to the invention.
Figure 13:
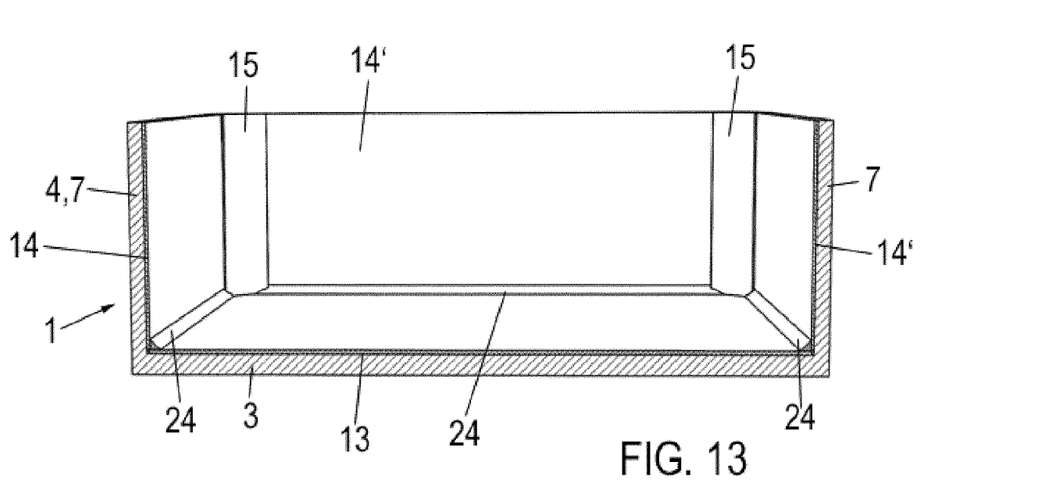

FIGS. 12 and 13 illustrate a further exemplary embodiment of the transport tray 1 according to the invention. FIG. 12 depicts the transport tray 1 in a perspective view obliquely from above; FIG. 11 depicts a (vertical) section of the transport tray 1 perpendicularly through the base 3. In this exemplary embodiment of the transport tray 1, for example, wedge-shaped corner strips 24 are provided here at the transition of the frame plates 14, 14' to the base plate 13. The corner strips 24 can seal the region of the respective abutting edge between the base plate 13 and the frame plates 14, 14' such that material is reliably and safely prevented from entering and reaching the support structure 2. The corner strips 24 form part of the lining 29 of the transport tray 1 and thus of the tray-shaped cavity 25 of the transport tray 1. With their wedge shape, the corner strips 24 are geometrically well adapted to the transition. Advantageously, the corner strips 24 are made of the same material as the base plate 13 and the frame plates 14, 14'. The corner strips 24 preferably contain at least 80%, particularly preferably at least 90%, aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof. The corner strips 24 can also be made of these materials.

Figure 14:
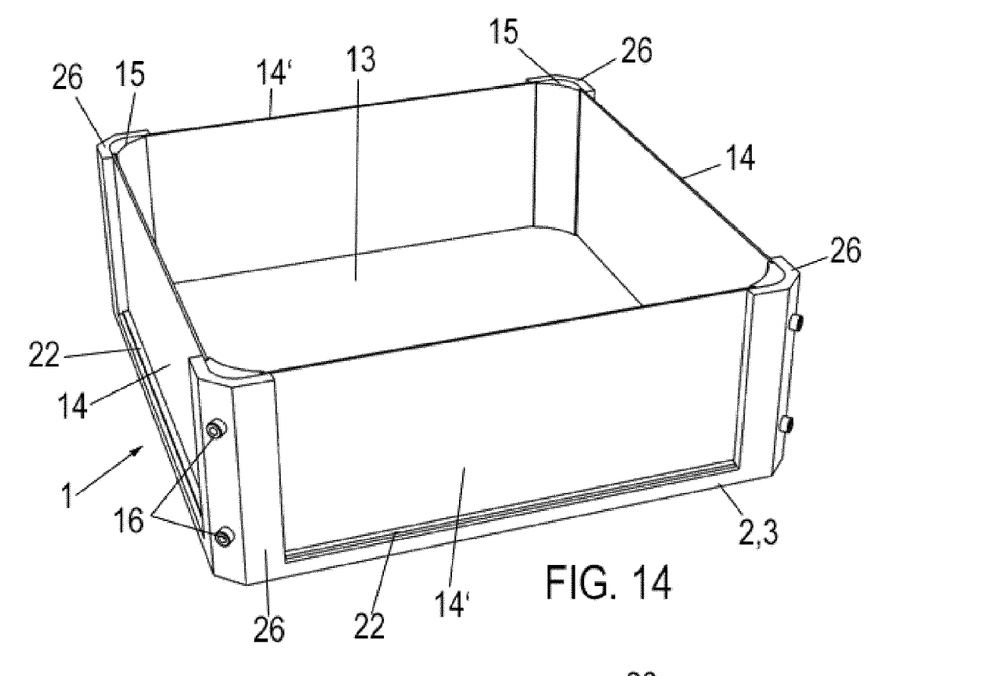
FIG. 14-15 different views of other exemplary embodiments of the transport tray according to the invention.
Figure 15:
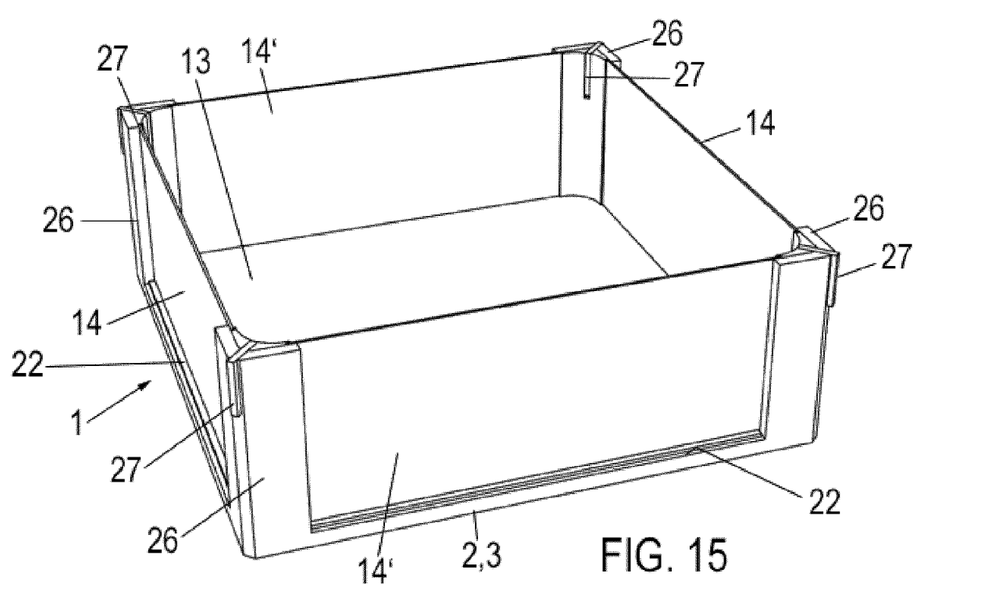

FIGS. 14 and 15 illustrate further exemplary embodiments of the transport tray 1 according to the invention. FIG. 14 depicts the transport tray 1 in a perspective view obliquely from above. FIG. 15 depicts a variant of the exemplary embodiment of FIG. 14, likewise in a perspective view obliquely from above.

In the embodiment of FIG. 14, analogous to the embodiment of FIG. 10, the frame sections 7, 7' of the frame 4 of the support structure 2 (but not the frame plates 14, 14') are in each case provided with a cutout 22, which extends over an area such that only corner pillars 26 of the frame 4 remain, to which the corner parts 15 for attaching the frame plates 14, 14' are screwed. In this embodiment, the support structure 2 is composed of the corner pillars 26 and the base 3; there are no frame webs 30 as shown in FIG. 10. The frame 4 is thus an open frame and consists only of the corner pillars 26. The frame sections 7, 7' are largely (more than 80%) cut out. The corner pillars 26 are composed in each case of the corner section 8 and a small region of the adjacent frame sections 7, 7'. This measure can save weight, material, and costs to a considerable extent. In addition, the heat transfer to the material to be fired can be even further improved.

In the exemplary embodiment of FIG. 15, the threaded screws 16 are replaced by spring-elastic clips 27, which are used to fasten the corner parts 15 to the corner pillars 26. The clips 27 are pushed onto the corner parts 15 and the corner pillars 26 from above. The clips 27 are made of a ceramic material with high thermal shock resistance. Advantageously, the clips 27 are made of specially stabilized zirconium oxide.

Here, the clips 27 have, for example, a U shape and can be pushed on or removed in a simple manner in order to fixedly connect or detach the corner parts 15 and the frame 4. The clips 27 are typically provided with a device (nose) such that they remain permanently in a locked state (not shown in detail here). Clamping at the four corner sections 8 ensures a permanent secure connection of the frame 4 and the frame plates 14, 14'.

Figure 16:
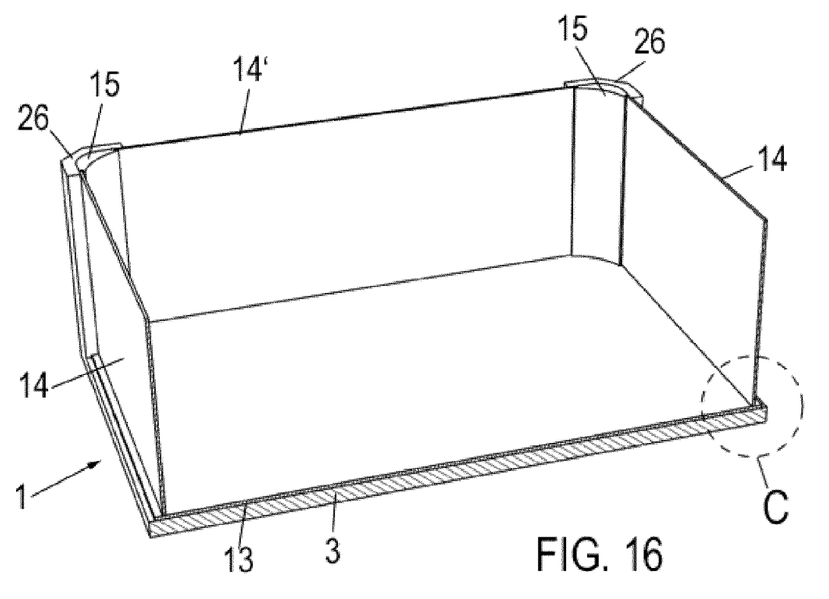
FIG. 16-17 different views of another exemplary embodiment of the transport tray according to the invention.
Figure 17:
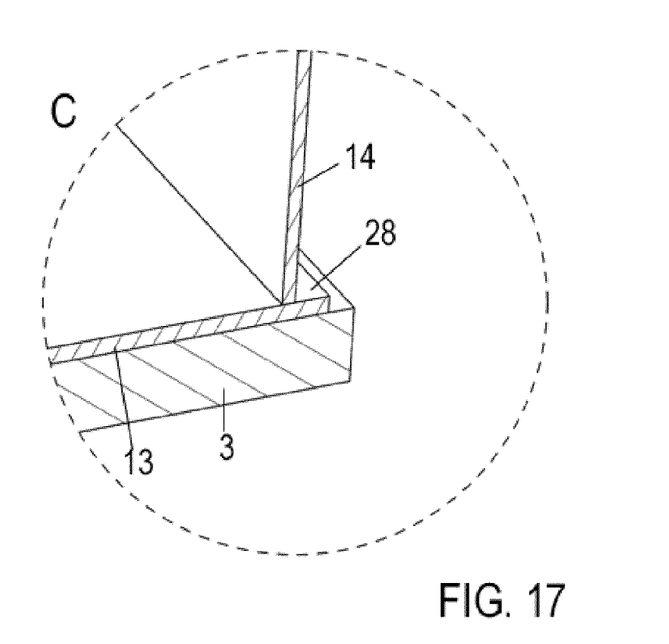

FIGS. 16 and 17 illustrate another exemplary embodiment of the transport tray 1 according to the invention, wherein FIG. 16 is a sectional view perpendicular to the plane of the base 3 and FIG. 17 depicts an enlarged sectional view according to the region C. This embodiment further develops the embodiments of FIG. 14 and FIG. 15.

Accordingly, the base plate 13 extends in the region of the frame plates 14, 14' beyond the frame plates 14, 14', with the frame plates 14, 14' seated on the base plate 13 in each case with their entire width. The base plate 13 is thus larger than the area surrounded by the frame plates 14, 14' and has a protrusion 28 relative thereto. This embodiment as well offers the advantage that the thermal expansion of the base plate 13 is not impeded in its plane, but the base plate 13 is nevertheless clamped well against the base 3. The attachment of the frame plates 14, 14' to the corner pillars 26 can be carried out as in FIGS. 14 and 15 such that their representation in FIG. 16 has been dispensed with.

Figure 18:
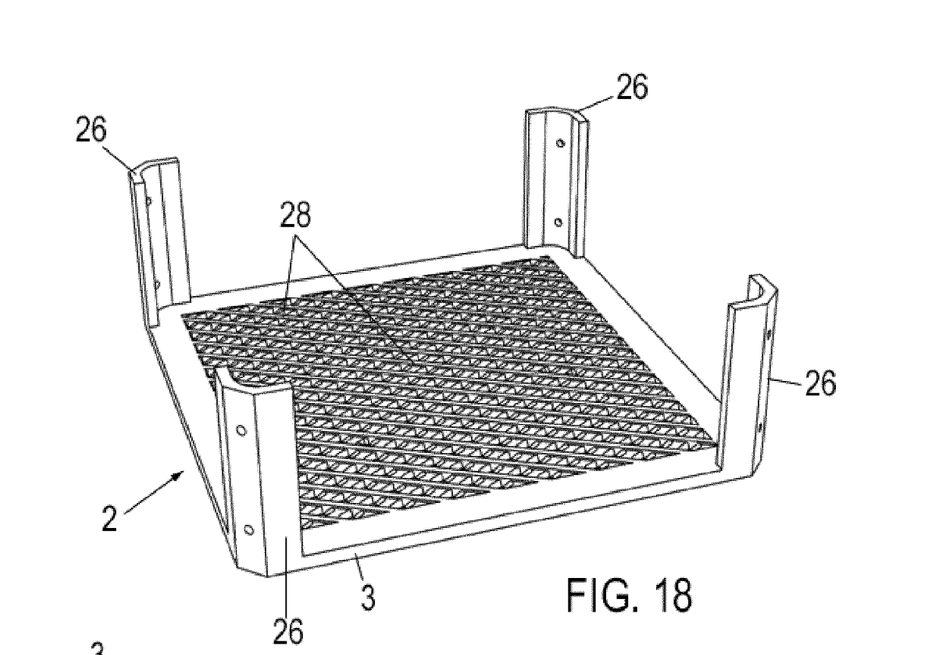
FIG. 18-19 different views of another exemplary embodiment of the transport tray according to the invention.
Figure 19:
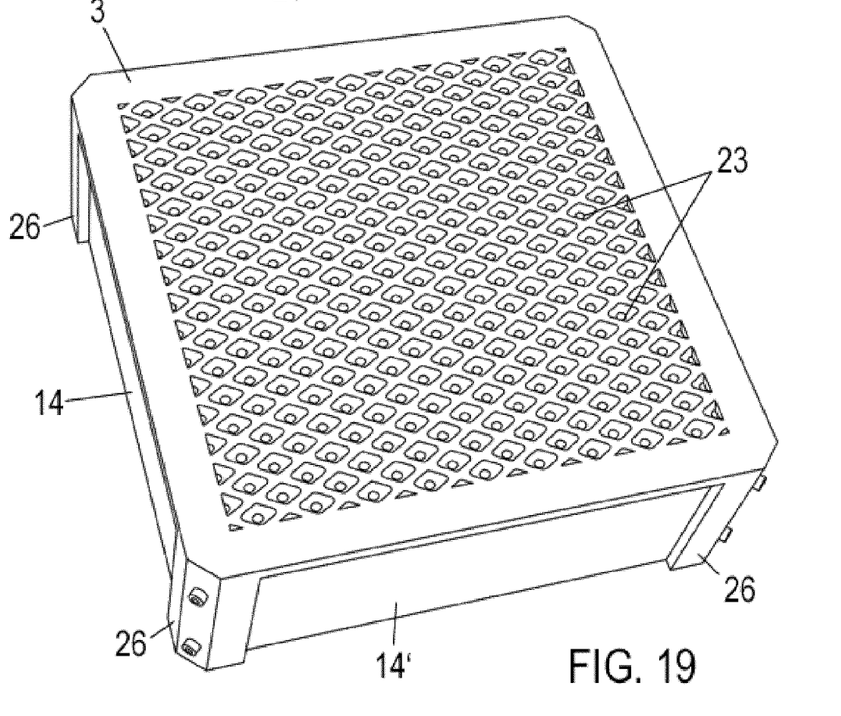

FIGS. 18 and 19 illustrate another exemplary embodiment of the transport tray 1 according to the invention, which continues the development of the embodiment of FIG. 14. FIG. 18 depicts only the support structure 2 of the transport tray 1 in a perspective view obliquely from above. FIG. 19 depicts the underside of the complete transport tray 1.

Accordingly, the support structure 2 is composed of the base 3 and the corner pillars 26. Supplementing the very large cutouts 22 of the frame 4, the base 3 of the support structure 2 is provided here, for example, with a large number of diamond-shaped holes 23. The holes 23 are arranged in a regular manner here, for example, in the form of a grid. The weight, material, and costs of the support structure 2 can be further reduced by this measure. The front base surface 5 is provided with a plurality of support webs 28 arranged in parallel, which serve to support the base plate 13.

It follows from the statements above that the invention makes available an improved transport tray for transporting and heating chemical substances. The transport tray advantageously has high corrosion resistance and, at the same time, good thermal shock resistance. The good thermal shock resistance is achieved through the selection of the material for the support structure and the geometric design of the lining of the tray-shaped cavity of the transport tray. High corrosion resistance can be achieved through the selection of the material for the lining. The materials for the support structure and the lining can be specifically matched to their essential functions. The material for the lining can advantageously be selected such that the purity or quality of the material to be fired is not adversely affected. The transport tray can thus be used for a large number of firing cycles, which is significantly higher than the number of firing cycles of conventional transport trays. As a result of the overall lower costs for the transport trays, the cost for large-scale production of chemical products can be reduced. This is true in particular for the production of active cathode materials for lithium-ion batteries. Likewise, the hazardous-waste generated by corrosion-damaged transport trays can be greatly reduced.

LIST OF REFERENCE CHARACTERS

1 transport tray
2 support structure
3 base
4 frame
5 front base surface
6 back base surface
7, 7' frame section
8 corner section
9 inside frame surface
10 outside frame surface
11 inner region
12 opening
13 base plate
14, 14' frame plate
15 corner part, clamping strip
16 threaded screw
17, 17 edge region
18, 18' groove
19, 19' protrusion
20, 20' clearance
21 gap
22 cutout
23 hole
24 corner strip
25 cavity
26 corner pillar
27 clip
28 support web
29 lining
30 frame web

The invention claimed is:

1. A transport tray for transporting and heating chemical substances, which comprises a one-piece support structure with a base and a frame fixedly connected thereto, wherein the one-piece support structure supports a lining of a tray-shaped cavity for accommodating the chemical substances, wherein the lining comprises a base plate lying on the base and multiple frame plates clamped against the frame, wherein the lining is supported by the one-piece support structure such that thermal expansions of the base plate and the frame plates in their plate planes are not impeded, wherein the frame plates are clamped to the frame by clamping strips, wherein the clamping strips each have at least one groove for accommodating an edge region of an adjacent frame plate, wherein the edge region is accommodated with play in the groove of the clamping strip.

2. The transport tray according to claim 1, wherein the frame of the one-piece support structure is a perimetral frame.

3. The transport tray according to claim 2, wherein the perimetral frame of the one-piece support structure comprises plate-shaped frame sections, wherein at least one plate-shaped frame section has at least one cutout.

4. The transport tray according to claim 3, wherein the at least one cutout is an internal cutout.

5. The transport tray according to claim 3, wherein the at least one cutout is an edge cutout.

6. The transport tray according to claim 1, wherein the frame of the one-piece support structure consists of a plurality of pillars.

7. The transport tray according to claim 1, wherein the frame plates are in each case seated on the base plate.

8. The transport tray according to claim 7, which has wedge-shaped corner strips for covering respective abutting edges between the frame plates and the base plate.

9. The transport tray according to claim 1, wherein the base plate lies on the base of the one-piece support structure and is arranged with play within the frame of the support structure and the remaining components of the lining.

10. The transport tray according to claim 1, wherein the base plate extends beyond the frame plates in the plate plane.

11. The transport tray according to claim 1, wherein a material of the lining is more corrosion-resistant than a material of the one-piece support structure, based on chemical reaction of the same product.

12. A method comprising producing a cathode material for a lithium-ion battery with a transport tray according to claim 1.

13. The transport tray according to claim 1, wherein the base of the one-piece support structure has a plurality of holes.

14. The transport tray according to claim 1, wherein the one-piece support structure contains a material selected from cordierite, mullite, a cordierite/spinel/mullite mixture, R—SiC, N—SiC, S—SiC, Si—SiC, oxidically bonded Si—C, or mixtures thereof, and/or wherein the lining contains at least 80% aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof.

15. The transport tray according to claim 1, wherein the base plate and the frame plates have a coating, comprising at least 80% aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof.

16. The transport tray according to claim 1, wherein the base plate and the frame plates have a coating, comprising at least aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof.

17. A transport tray for transporting and heating chemical substances, which comprises a one-piece support structure with a base and a frame fixedly connected thereto, wherein the one-piece support structure supports a lining of a tray-shaped cavity for accommodating the chemical substances, wherein the lining comprises a base plate lying on the base and multiple frame plates clamped against the frame, wherein the lining is supported by the one-piece support structure such that thermal expansions of the base plate and the frame plates in their plate planes are not impeded, wherein the base of the one-piece support structure has a plurality of holes.

18. The transport tray according to claim 17, wherein the frame of the one-piece support structure is a perimetral frame.

19. The transport tray according to claim 17, wherein the frame of the one-piece support structure consists of a plurality of pillars.

20. A transport tray for transporting and heating chemical substances, which comprises a one-piece support structure with a base and a frame fixedly connected thereto, wherein the one-piece support structure supports a lining of a tray-shaped cavity for accommodating the chemical substances, wherein the lining comprises a base plate lying on the base and multiple frame plates clamped against the frame, wherein the lining is supported by the one-piece support structure such that thermal expansions of the base plate and the frame plates in their plate planes are not impeded, wherein the one-piece support structure contains a material selected from cordierite, mullite, a cordierite/spinel/mullite mixture, R—SiC, N—SiC, S—SiC, Si—SiC, oxidically bonded Si—C, or mixtures thereof, and/or wherein the lining contains at least 80% aluminum/magnesium spinel, yttrium oxide ($Y_2O_3$), cerium oxide ($CeO_2$), hafnium oxide, aluminum oxide ($Al_2O_3$), magnesium oxide (MgO), zirconium oxide ($ZrO_2$), or mixtures thereof.

21. The transport tray according to claim 20, wherein the frame of the one-piece support structure is a perimetral frame.

22. The transport tray according to claim 20, wherein the frame of the one-piece support structure consists of a plurality of pillars.

* * * * *